(12) United States Patent
Kodaira et al.

(10) Patent No.: US 7,570,878 B2
(45) Date of Patent: Aug. 4, 2009

(54) IMAGE PROCESSING DEVICE

(75) Inventors: Naoaki Kodaira, Kokubunji (JP);
Hiroyuki Mizutani, Yokohama (JP);
Toshimasa Dobashi, Mitaka (JP); Akio Furuhata, Fuchu (JP)

(73) Assignees: Kabushiki Kaisha Toshiba, Tokyo (JP);
Toshiba Solutions Corporation, Tokyo (JP)

( * ) Notice: Subject to any disclaimer, the term of this patent is extended or adjusted under 35 U.S.C. 154(b) by 542 days.

(21) Appl. No.: 11/389,341

(22) Filed: Mar. 27, 2006

(65) Prior Publication Data

US 2006/0221207 A1 Oct. 5, 2006

(30) Foreign Application Priority Data

Mar. 29, 2005 (JP) .............................. 2005-096214

(51) Int. Cl.
*G03B 17/00* (2006.01)
*G06F 3/033* (2006.01)

(52) U.S. Cl. ........................... 396/50; 396/52; 396/287; 348/208.16; 348/218.1; 348/231.3; 345/157

(58) Field of Classification Search ................... 396/50, 396/52, 54, 287; 348/208.16, 218.1, 231.2, 348/231.3, 231.6, 208.12, 333.02; 345/157
See application file for complete search history.

(56) References Cited

U.S. PATENT DOCUMENTS

2004/0070675 A1* 4/2004 Fredlund et al. ......... 348/208.1
2004/0085455 A1 5/2004 Silverstein

FOREIGN PATENT DOCUMENTS

| JP | 9-114921 | 5/1997 |
| JP | 2002-222196 | 8/2002 |
| JP | 2004-96156 | 3/2004 |

OTHER PUBLICATIONS

Notification of First Office Action issued by the Chinese Patent Office on Apr. 18, 2008, for Chinese Patent Application No. 2006100674851, and English-language translation thereof.

* cited by examiner

*Primary Examiner*—W. B. Perkey
(74) *Attorney, Agent, or Firm*—Finnegan, Henderson, Farabow, Garrett & Dunner, L.L.P.

(57) ABSTRACT

A cellular phone body 10 includes a memory 12, a CPU 18, a camera 15, and a display 17. The CPU 18 displays on the display 17 a pointer P in a manner to overlap an image of an photographic subject photographed by the camera 15, and judges whether or not to save in an image data saving area 12*f* of the memory 12 the image of the photographic subject imaged by the camera 15 and buffered in a first buffer 12*c* of the memory 12, based on information of a move locus of the pointer P moving on the image of the photographic subject along a movement of the cellular phone body at a time of imaging the photographic subject with the camera 15.

20 Claims, 15 Drawing Sheets

IMAGE PROCESSING DEVICE

CROSS-REFERENCE TO THE INVENTION

This application is based upon and claims the benefit of priority from the prior Japanese Patent Application No. 2005-96214, filed on Mar. 29, 2005; the entire contents of which are incorporated herein by reference.

BACKGROUND OF THE INVENTION

1. Field of the Invention

The present invention relates to an image processing device having a camera and a screen and displaying an image data imaged by the camera on the screen.

2. Description of the Related Art

Recently, as digital cameras become widespread, there are increasing occasions in which images are loaded even in everyday life.

Additionally, as for portable terminal devices such as a cellular phone and a PDA (Personal Digital Assistant), an increasing number of devices have sophisticated camera functions mounted thereto.

Some portable terminal devices perform sophisticated processings such as character recognition on loaded images.

Meanwhile, for example, in a cellular phone on which a camera function is mounted, when a photographic subject is imaged by the camera and an image thereof is loaded, usually an angle of view and a photographing distance are adjusted such that the image falls within a screen represented by an attached liquid crystal display before a shutter is pressed.

It means all of the image area displayed on the screen is saved. It is common that the area is usually set to be a rectangular shape.

However, users use the devices in various ways, and sometimes an area of an image required to be loaded does not match an area displayed in the screen, that is, the rectangular area.

In this case, the user has to cut out a necessary area from image data by carrying out troublesome image editing work after once saving the imaged image data in a memory or the like.

Additionally, since unnecessary image data are also loaded in the memory, though temporarily, an image size becomes large, wasting the memory of a digital camera or a cellular phone.

On the other hand, in a character recognition device or the like which is connected with a scanner, when an image of document or the like is loaded by the scanner and character recognition is carried out, it can be considered, as a method to designate an area to be character-recognized, carrying out a processing such as a layout analysis after loading a part or whole of the document as image data, displaying a result thereof by enclosing a character or a line, and making a user designate an area to be recognized.

However, in this case, the user has to designate a target area from a plurality of characters or lines.

Further, depending on a result of the layout analysis, the area may not be extracted correctly.

Also, if a character line which does not fall within the screen in one imaging is desired to be character-recognized, a plurality of imagings and recognitions are required to be repeated.

Additionally, in a portable terminal device such as a PDA, as a method to designate a desired area to be loaded as an image when recognizing such a document as newspaper whose column setting is complicated, there is a method in which an interface such as a touch panel equipped to the portable terminal device is used.

Though, in this case, a user can designate the area by the interface of the portable terminal device, in other portable terminal devices, for example, in a cellular phone or a camera, area designation is difficult since the devices such as a touch panel cannot be equipped due to cost concern.

As a prior art in which the area designation is carried out without using the touch panel, there is disclosed an art in which an image processing device comprises a position designating device to designate a position on an image in order for character recognition, a character recognition device to recognize a character included in a partial image including the designated position, a database searching device to search a database based on a character recognition result, and an information display control device to control displaying the searched database information along with an image on a display device (for example, see Patent Document 1).

In the case of this image processing device, though the touch panel itself is not used, the position designating device is connected to the character recognition device.

Therefore, it is required to connect some device for position designation to the character recognition device as in the case of the touch panel, resulting in a higher cost.

[Patent Document] Japanese Patent Laid-open Application No. 2002-222196

SUMMARY OF THE INVENTION

As described above, in the prior art, as for an image on a screen inputted from a camera, a user cannot easily designate a desired area of that image unless an interface device such as a touch panel or a position designating device is equipped.

Additionally, when a large-size image is loaded which does not fall within the screen in one imaging, it is necessary to repeat a plurality of imaging operations of a photographic subject (user's carrying out saving operations of the image data imaged by the camera), and it is a troublesome work for the user.

The present invention is made to solve such problems, and its object is to provide an image processing device in which a desired area of an image data imaged by a camera can be easily loaded as image data without using an interface device such as a touch panel or a position designating device.

An image processing device according to an embodiment of the present invention includes, in an image processing device displaying on a display an image obtained by imaging a photographic subject with a camera while moving an image processing device body to which the camera and the display are mounted: a memory having an area capable of storing the image of the photographic subject imaged by the camera and information of a move locus of the image displayed on the display; a memory controller which stores the information of move locus of the image displayed on the display to the memory, the image moving along a movement of the image processing device body at a time of imaging the photographic subject with the camera; and a judging part judging whether or not to save in the memory the image of the photographic subject imaged by the camera based on the information of the move locus stored in the memory by the memory controller.

An image processing device according to another embodiment of the present invention includes, in an image processing device displaying on a display an image obtained by imaging a photographic subject with a camera while moving an image processing device body to which the camera and the display are mounted: a memory having a buffer capable of buffering the image of the photographic subject imaged by the camera, a storing area capable of storing information of a move locus of the image displayed on the display, and a saving area capable of saving the image; a pointer displaying part displaying on the display a pointer to designate a position of the image in a manner to overlap the image of the photographic subject imaged by the camera; a memory controller storing in the memory the information of the move locus of the pointer moving on the image of the photographic subject along a movement of the image processing device body at a time of imaging the photographic subject with the camera; and a judging part judging whether or not to save in the saving area the image of the photographic subject imaged by the camera and buffered in the buffer based on the information of the move locus stored in the storing area by the memory controller.

DESCRIPTION OF THE EMBODIMENTS

Hereinafter, embodiments of the present invention will be described in detail with reference to the drawings.

The embodiments of the present invention will be described with reference to the drawings, but these drawings are provided only for an illustrative purpose, and in no way limit the invention.

First Embodiment

Figure 1:
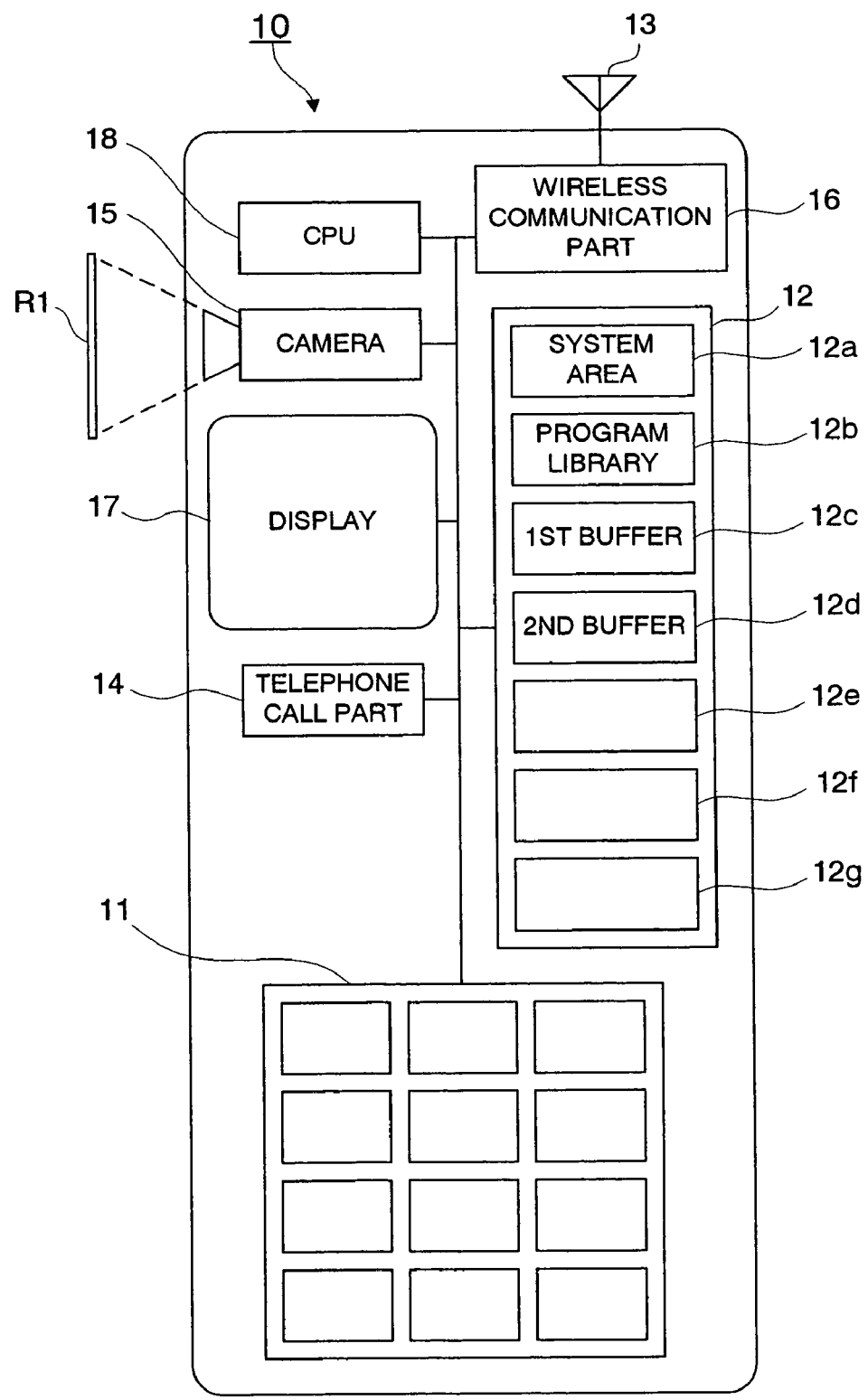
FIG. 1 is a view showing a constitution of a cellular phone according to an embodiment of the present invention.

As shown in FIG. 1, this cellular phone includes a key operation part 11, a memory 12, an antenna 13, a telephone call part 14, a camera 15, a wireless communication part 16, a display 17, a central processing unit (hereinafter, referred to as a CPU 18), and so on, in a cellular phone body 10.

The key operation part 11 is provided with a ten-key, a power button, a telephone call button, a direction key (→, ←, ↓, ↑ or the like), a function key, and so on.

The key operation part 11 accepts an instruction according to a key operation or a button operation by a user.

The memory 12 is provided with storing areas such as a system area 12a, a program library 12b, a first buffer 12c, a second buffer 12d, an image data saving area 12e, a move locus storing area 12f, a pointer storing area 12g.

In the system area 12a, there are stored a program (firmware or the like) which controls a function of this cellular phone, setting information and the like.

The system area 12a is an area in which a program of this system area 12a is executed by the CPU 18 by pressing down of the power button.

The system area 12a is the area which cannot be rewritten by an operation from an ordinary user.

The program library 12b is an area in which a program executable in this cellular phone is stored.

In the program library 12b, there is stored JAVA application software, BREW application software or the like which is acquired, for example, from an internet Web site or the like by packet telecommunication, or stored in advance.

Incidentally, in this embodiment, these softwares are assumed to have been stored in advance in the memory 12 at a time of product shipment.

Description of a process in which the software becomes usable in the cellular phone will be refrained from.

JAVA, BREW and the like are registered trademarks.

The first buffer 12c is an area in which image data imaged by the camera 15 is sequentially held (buffered).

The second buffer 12d is a working area to process the image data buffered in the first buffer 12c.

Here, to process means a cut-out processing of an image, a connection processing of images, or the like.

The image data buffered in the first buffer 12c and the second buffer 12d are deleted after they are saved in the image data saving area 12e.

That is, the first buffer 12c and the second buffer 12d are temporary storage areas of the image data.

In the image data saving area 12e, image data is saved which is finally decided to be saved among the image data buffered in the first buffer 12c, the second buffer 12d, or the like.

The above-described image data are image data being a cut-out of a part of the area, large image data after image connection, or the like.

In the pointer storing area 12g, there are stored, as pointers displayed on the screen of the display 17, a cruciform pointer to designate a point and a pointer in a highlighter pen form with a given width to trace an objective part of the image, for example.

The width and the form of the pointer in the highlighter pen form can be changed by an instruction from a setting screen.

In the move locus storing area 12f, there is sequentially stored information of a move locus at a time when the pointer displayed on the screen moves on the screen.

In the move locus storing area 12f, there are saved the image data loaded at the beginning which is developed (mapped) into a bit map form or the like.

When the information of the move locus (position coordinate) is inputted, a dot is stored at a corresponding position of the position coordinate of the image data in the move locus storing area 12f.

How the information of the move locus is held varies according to the form of the pointer.

For example, if the pointer is the cruciform one, the dot is stored at a position of an intersection point of the cruciform, in the move locus storing area 12f.

If the pointer is the one in the highlighter pen form, the dot is stored in a width of an outline of the highlighter pen, in the move locus storing area 12f.

The wireless communication part 16 carries out wireless communication with a wireless base station of a cellular phone network via the antenna 13.

The wireless communication includes voice communication (telephone call), packet telecommunication (data communication), and so on.

The telephone call part 14 includes a speaker and a microphone, a voice circuit part, and so on.

The telephone call part 14 is apart for the user to carry out a telephone call as the cellular phone.

The camera 15 is constituted with an image capturing element such as a CCD element and a CMOS sensor, a drive circuit thereof, an optical system such as a lens, and the like, for example.

The camera 15 images a photographic subject R1 to obtain image data.

The camera 15 is disposed on a surface of the opposite side of the display 17.

The photographic subject R1 includes a business card, a nominal list, writing paper, a business form such as a slip, and also landscape and the like.

The display 17 is a device which displays an image data imaged by the camera 15, and is a thin-type display or the like such as an LCD or an EL, for example.

The display 17 is disposed on a surface of the opposite side of the camera 15 of the cellular phone body 10 (on the same surface of the key operation part 11).

As for the display 17, it is possible that the image data imaged by the camera 15 is projected on the display 17 and the user carries out a key operation while seeing that image.

The display 17 includes a rectangular screen (display area) of QVCA (240×320 dot) size or the like, for example.

It should be noted that the present invention is not limited to the size of the screen described above but devices of various sizes or dot numbers may be used.

The CPU 18 controls above-described respective parts.

The CPU 18, for example, functions as a pointer indication part which indicates a pointer P for designating the position of the image on the screen in a manner to overlap the image of the photographic subject R1 imaged by the camera 15.

Additionally, the CPU 18 functions as a memory controller which stores in the move locus storing area 12f of the memory 12 information of the move locus of the pointer P moving on the image of the photographic subject R1 along a movement of the cellular phone body 10 at the time that photographic subject R1 is imaged by the camera 15.

The CPU 18 functions as a judging part which judges whether or not to store in the image data saving area 12e of the memory 12 the image of the photographic subject R1 imaged by the camera 15 based on the information of the move locus stored in the move locus storing area 12f of the memory 12.

If, for example, the area is closed by the information of the move locus stored in the move locus storing area 12f, the CPU 18 judges that the image of the photographic subject R1 imaged by the camera 15 should be stored in the image data storing area 12e.

The CPU 18 displays on the display 17 a setting screen (user interface screen) which is to be used by the user to select one of the pointers stored in the pointer storing area 12g of the memory 12 as usage.

In the setting screen displayed on the display 17, the CPU 18 retrieves the pointer selected by the user from the pointer storing area 12g and displays the pointer, and also carries out control for area designation according to the form of the selected pointer.

The CPU 18 judges, according to the form of the pointer, whether or not to save the image in the image data saving area 12e of the memory 12 by using the information of the move locus stored in the memory 12.

When the form of the pointer is cruciform, for example, the CPU 18 judges, if a certain area (terminated area) is formed by a series of dot data, that the image in that area should be saved.

Additionally, when the form of the pointer is the highlighter pen form, the CPU 18 judges that the image included in a line of a certain width from start of writing to end of writing should be saved.

When the move locus of the pointer exceeds a predetermined range (distance), the CPU 18 functions as a notifying part which displays to that effect on the screen of the display 17, and so on, to carry out notification.

The predetermined range is a value (range) half of a display dot number in a lateral direction of the screen for a horizontal movement of the pointer, when it is assumed that the pointer is displayed in a central part of the screen.

Specifically, when it is assumed that the number of pixels in the lateral direction of the screen is 240 dots, as a value half thereof, a value of 120 dots is assumed to be a moving limit value of the pointer.

As an example of notification, when the pointer moves on the image by a distance equal to or more than half of a distance from right to left of the screen, the CPU 18 displays an icon which calls attention to a running off (such as "!" mark or the like) on the screen in a blinking manner.

The CPU 18, when judging that the image should be saved, functions as an image connecting part which performs connection processing on the plurality of images buffered in the first buffer 12c or the second buffer 12d or the like of the memory 12.

The CPU 18 functions as a saving control part which saves the connected image in the image data saving area 12e of the memory 12.

The CPU 18 functions as a super resolution part which generates a high-definition image from a plurality of images when the plurality of images exist for the same area.

A super resolution technology is one of techniques to generate a high resolution image from a plurality of low resolution images which have overlaps.

As the super resolution technology, there is used a technique called iterative back projection to generate a high resolution image from a plurality of low resolution images by repeated calculation, for example.

The CPU 18, when judging that the image should be saved, judges whether or not an unloaded area exists in the image of the photographic subject R1, and based on a judgment result thereof, perform a connection processing on the plurality of images buffered in the memory 12.

The CPU 18, when unloaded area is not left, saves the connected image as final image data in the image data saving area 12*e* of the memory 12.

The CPU 18 judges whether or not an unloaded area exists in the connected image, and when judging that the unloaded area exists, the CPU 18 prompts whether or not to image the image again, and at a point that the CPU 18 judges no unloaded area is left, the CPU 18 notifies to that effect.

Specifically, when the unloaded area exists, the CPU 18 displays an icon and deletes the icon at the point that the CPU 18 judges that no unloaded area is left.

At the point that no imaged area is left by connecting a new image to the loaded area, the CPU 18 deletes the icon and notifies to that effect.

Figure 22:
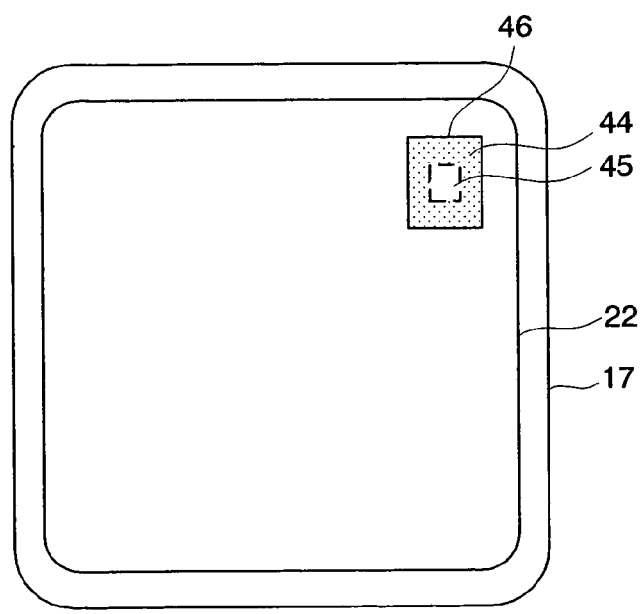
FIG. 22 is a view showing an example in which a connected image having an unloaded area is iconized and displayed on a screen.

The CPU 18, when judging that the unloaded area exists, displays an unloaded area 45 and a loaded area 44 on the screen 22 in a distinguishable manner (see FIG. 22)

When the unloaded area and loaded area change by connecting the new image which is loaded again because the unloaded area 45 has existed, the CPU 18 updates an icon display of the unloaded area and the loaded area to correspond to the respective areas.

Subsequently, an operation of a cellular phone of a first embodiment will be described.

Figure 2:
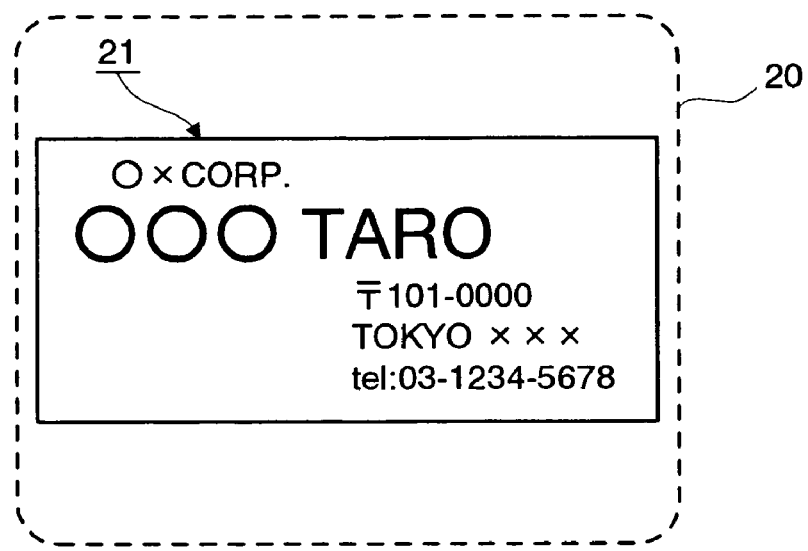
FIG. 2 is a view showing an image pick-up range of a camera of the cellular phone of FIG. 1 and a size of a business card.

A case that a photographic subject R1 to be imaged by a cellular phone is a business card 21 as shown in FIG. 2, for example, will be explained.

When the photographic subject R1 is the business card 21, an image of the business card 21 is included in an image pick-up range 20 to be imaged by a camera 15 of a cellular phone body 10.

The image pick-up range 20 and a screen of a display 17 are assumed to be the same in size.

The image of the business card 21 displayed on the screen of the display 17 is a real-time image data imaged by the camera 15.

The displayed image is varied by moving either the cellular phone body 10 (camera 15) or the business card 21 being the photographic subject.

When, by using a camera function of this cellular phone, a desired area is designated from the image of the business card 21 displayed on the screen of the display 17, an image loading function or the like which belongs to the camera function is selected.

Figure 3:
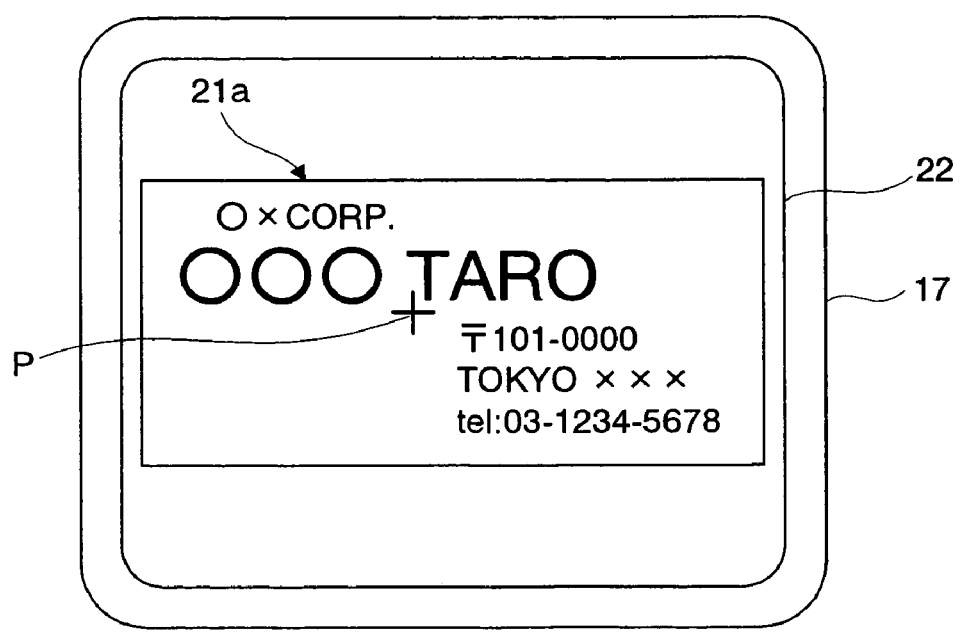
FIG. 3 is a view showing an example of a screen of the cellular phone.

When the user selects the image loading function, the CPU 18 displays a pointer P to designate an area or a position on a screen 22 of the display 17, simultaneously with the image inputted from the camera 15, as shown in FIG. 3.

The pointer P is displayed in almost a center of the screen 22.

A position of the pointer P in relation to the screen 22 is not moved.

Here, by the user carrying out an operation on a key operation part 11 to change the pointer and changing the kind of the pointer from a pointer kind change screen displayed on the screen, a method to designate the area can be altered.

The area designation method and the kind of the pointer will be described later.

As the user holds the cellular phone body 10 and moves the image pick-up range of the camera 15, a CPU 18 saves position information of the pointer P which moves on the imaged images, that is, information of a move locus, in a move locus storing area 12*f* of a memory 12.

When the camera 15 is moved, on the screen 22, the displayed image is moved and along therewith a position of a photographic subject designated by the pointer P is also moved.

By storing a position coordinate of the pointer P on the moved image in the move locus storing area 12*f* at a certain time interval, the CPU 18 regards the position coordinate as the move locus of the pointer P.

As the method to regard the position coordinate as the move locus of the pointer P, that is, a method to detect how far the pointer P moves, there is a method, for example, to generate an edge image by the CPU 18 performing edge detection processing on the image inputted from the camera 15 at some point in time.

In this case, the CPU 18 finds an edge part from the generated edge image and temporarily stores (holds) the edge part in a first buffer 12*c* of the memory 12.

Next, the CPU 18 performs the edge detection processing also on an image data imaged (inputted) after a certain period of time and finds an edge part.

Then, the CPU 18 finds a travel distance of the entire image in X direction and Y direction by performing a pattern matching processing of the edge part of the image found this time and the edge part obtained from the previous image buffered in the first buffer 12*c*.

When it is assumed that the pointer P is always in a center on the screen 22, the travel distance of the pointer P becomes (x, y), which is stored in the move locus storing area 12*f* as the information of the move locus.

If the distance of the camera 15 and the photographic subject vary between two images, that is, if there is a variation in Z direction (optical axis direction), the CPU 18 finds the travel distance correctly by finding feature amounts from the edge images, comparing those feature amounts, and normalizing image sizes.

As the feature amount, in a case that an object to be imaged is a business form which includes a character line such as the business card 21, a height of the character line can be applied to.

The CPU 18 uses the information of the move locus (link of position information) which is stored in the move locus storing area 12*f* sequentially at a certain time interval, and carries out operational judgment of whether or not to save the image data imaged by the camera 15 and of whether or not to carry out an operation.

That is, while holding the cellular phone body 10 by hand and moving it, the user carries out area designation with the pointer P in the center of the screen, with moving the image data imaged by the camera 15 in the screen 22.

The CPU 18 carries out a judgment of whether or not the area designation is terminated based on a judgment condition of each pointer P which is set in advance.

The CPU 18 judges, based on the information of the move locus of the pointer P which is sequentially stored in the memory 12 and the judgment condition, that the area designation is terminated on the judgment condition that the move locus of the pointer P draws a closed curve, in a case that the pointer P is cruciform, for example.

When the pointer P is in the highlighter pen form, for example, the CPU 18 judges that the area designation is terminated on the judgment condition that the pointer P halts for a given time from its start of movement, and so on.

When judging that the area designation is terminated based on the judgment condition, the CPU 18 stores in the image data storing area 12e of the memory 12 the area designated by the pointer P in the inputted images as a still image.

A more specific content of the processing will be described. When the photographic subject is the business card 21 shown in FIG. 2, for example, there are a field of a company name, a field of a name, and a field of an address and telephone number on the business card 21.

It is assumed that only the field of the name is area-selected and the image thereof is cut out (captured).

In this case, from a state of the screen 22 in FIG. 3, that is, the state in which the pointer P is below the field of the name of an image 21a of the business card 21, the user first moves the cellular phone body 10 to set the pointer P to a starting point of an area which is desired to be loaded in the image 21a of the business card 21 displayed on the screen 22.

Then, the user operates a function key or the like of a key operation part 11 to instruct start of loading, when the CPU 18 initializes the first and second buffers 12c, 12d, the move locus storing area 12f, and the like.

Subsequently, the CPU 18 temporarily saving (buffering) the image data imaged by the camera 15 in the first buffer 12c and starts storing the move locus of the pointer P (step S101 in FIG. 4).

Then, the CPU 18 performs an edge detection processing on new image data buffered in the fist buffer 12c and mapped image data saved in the move locus storing area 12f (image data being a comparative base) (step S102).

At this time, the CPU 18 judges for the image data buffered in the first buffer 12c whether or not the image data previously stored in the move locus storing area 12f of the memory 12 (image data being a comparative base) exists (step S103).

For image data loaded for the first time, since previous image data being the comparative base does not exist, the CPU 18 judges that there is no previous image data ("No" in a step S103).

The CPU 18 saves in the move locus storing area 12f of the memory 12 the present image data buffered in the first buffer 12c as image data being the comparative base. (step S104)

The image data being the comparative base is bit map data to find the move locus.

After a save, the CPU 18 loads an image again (steps S101 to S103).

In a judgment processing of the step S103 being a next step, the image data being the comparative base already exists in the move locus storing area 12f of the memory 12.

Therefore, the CPU 18 performs a pattern matching processing of an edge image of the image data newly loaded in the first buffer 12c and the image data of the move locus storing area 12f (step S105). In the pattern matching processing, the CPU 18 judges whether or not the pattern matching processing is successful (step S106).

As a result of this judgment, if the pattern matching is not successful, ("No" in a step S106), the CPU 18 displays an alert (mark such as "!") indicating failure of area designation on the screen 22 in a blinking manner (step S107).

Subsequently, the CPU 18 displays on the screen 22 a message of whether or not to reload the image to prompt the user for an instruction operation (step S108)

Here, if it is instructed by the key operation part 11 that the reloading should be carried out ("Yes" in the step S108), the CPU 18 returns to the processing of the step S101 and repeats the processings of the previous steps S101 to S106.

Meanwhile, if the pattern matching processing is successful ("Yes" in the step S106), the CPU 18 calculates a travel distance of the pointer P from a difference between the images found by the pattern matching processing (step S109).

The CPU 18 stores in the move locus storing area 12f of the memory 12 the position information on the image which is indicated by the calculated travel distance, as the information of the move locus (step S110).

Next, the CPU 18 judges whether or not an area designation termination condition (judgment condition) is satisfied (step S111).

As an example of the area designation termination condition, in the case of this cruciform pointer. P, the condition is set as a case the move locus of the pointer P stored in the move locus storing area 12f becomes a closed curve, for example.

Here, if the CPU 18 judges that the area designation termination condition is not satisfied ("No" in the step S111), the CPU 18 updates a move locus display of the pointer P displayed on the screen 22 (step S112), and repeats the processings of the above-described steps.

Figure 5:
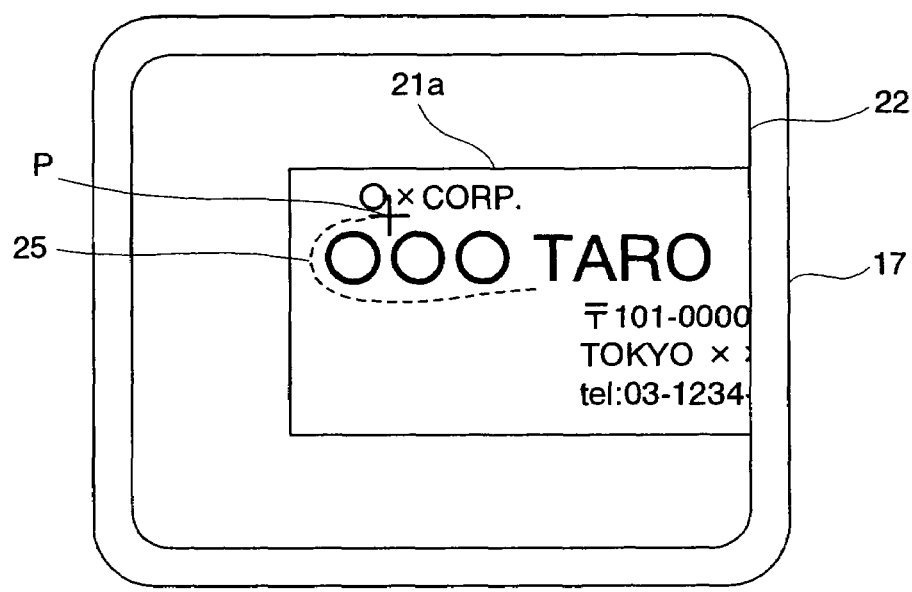
FIG. 5 is a view showing a state in which an area is designated on the screen of the cellular phone.

As a display example of the pointer move locus, for example, as shown in FIG. 5, the CPU 18 retrieves the move locus data of the pointer P stored in the move locus storing area 12f, makes the data overlap the imaged image on the screen 22 to display them.

In this example, there is shown by a broken line or the like the move locus of the pointer P which moves on the image in the screen 22 by the movement while imaging with the camera 15.

Other than the broken line, a solid line with a color different from that of the imaged image can be displayed.

Figure 6:
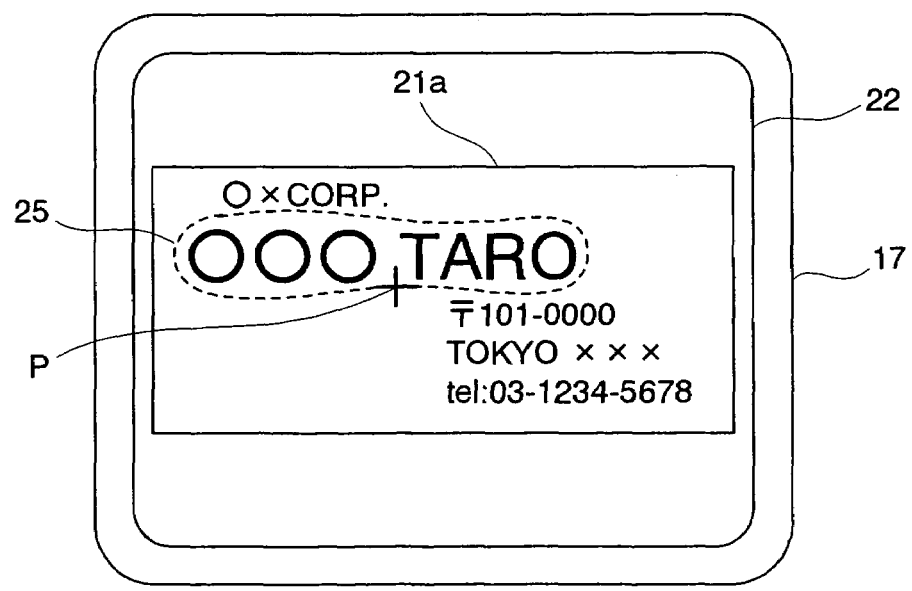
FIG. 6 is a view showing a state in which designation of the area is terminated.

When the movement of the cellular phone body 10 by the user proceeds and the character line image is enclosed by the move locus 25 of the pointer P and the move locus 25 becomes the closed curve, as shown in FIG. 6, the CPU 18 judges that the area designation termination condition (judgment condition) is satisfied ("Yes" in the step S111).

In such a state ("Yes" in the step S111), the CPU 18 performs a processing of holding the image data imaged at that time in the second buffer 12d and a cut-out (capturing) processing of an area enclosed by the move locus 25 of the pointer P (step S113).

As for a timing of holding the image, the timing can be a moment when the area designation termination condition (judgment condition) is satisfied, or the timing can be instructed by the user pressing the function key or the like of the key operation part 11.

In the cut-out processing of the area, the CPU 18 generates image data of only the designated area by deleting an area other than area-designated area from the image data bufferd as a still image in the second buffer 12d being a working area, and saves the generated image data in the image data saving area 12e as final image data.

Figure 7:
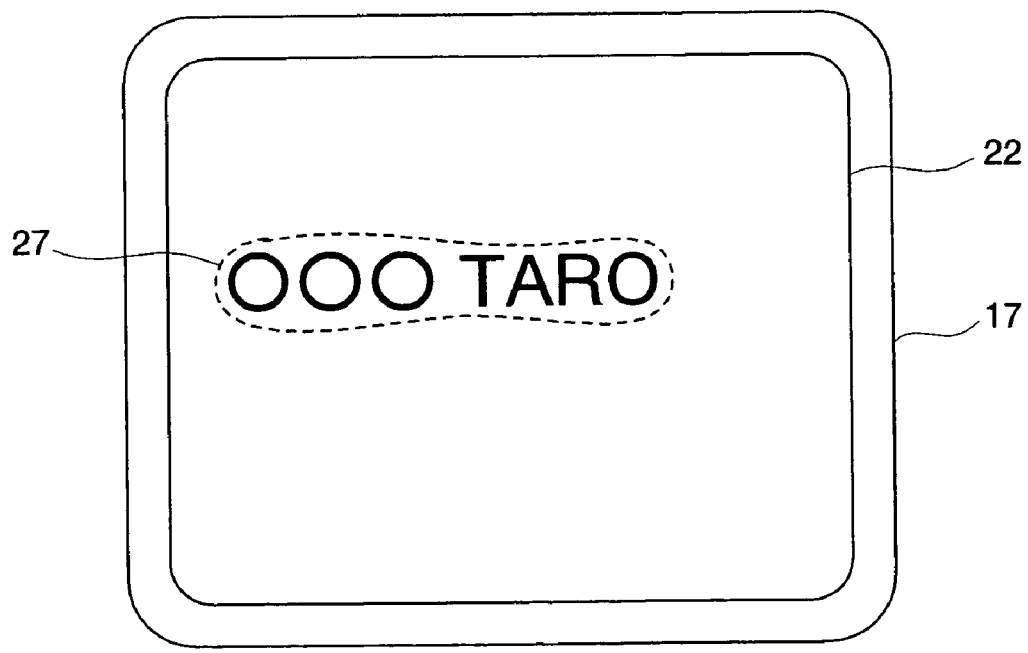
FIG. 7 is a view showing a state in which the designated area is displayed.

FIG. 7 shows a state in which only an area 27 which is cut out is displayed on the screen 22 as a result of termination of the image saving processing and the area cut-out processing.

In the first embodiment described hereinbefore, the process of the above-described flowchart is applied when all the area to be designated is displayed in the screen 22.

Therefore, by moving the camera 15, the area which can be designated may be exceeded.

Thus, an example in which the CPU 18 performs the processing in response to such a case will be described with reference to a flowchart of FIG. 8.

Figure 4:
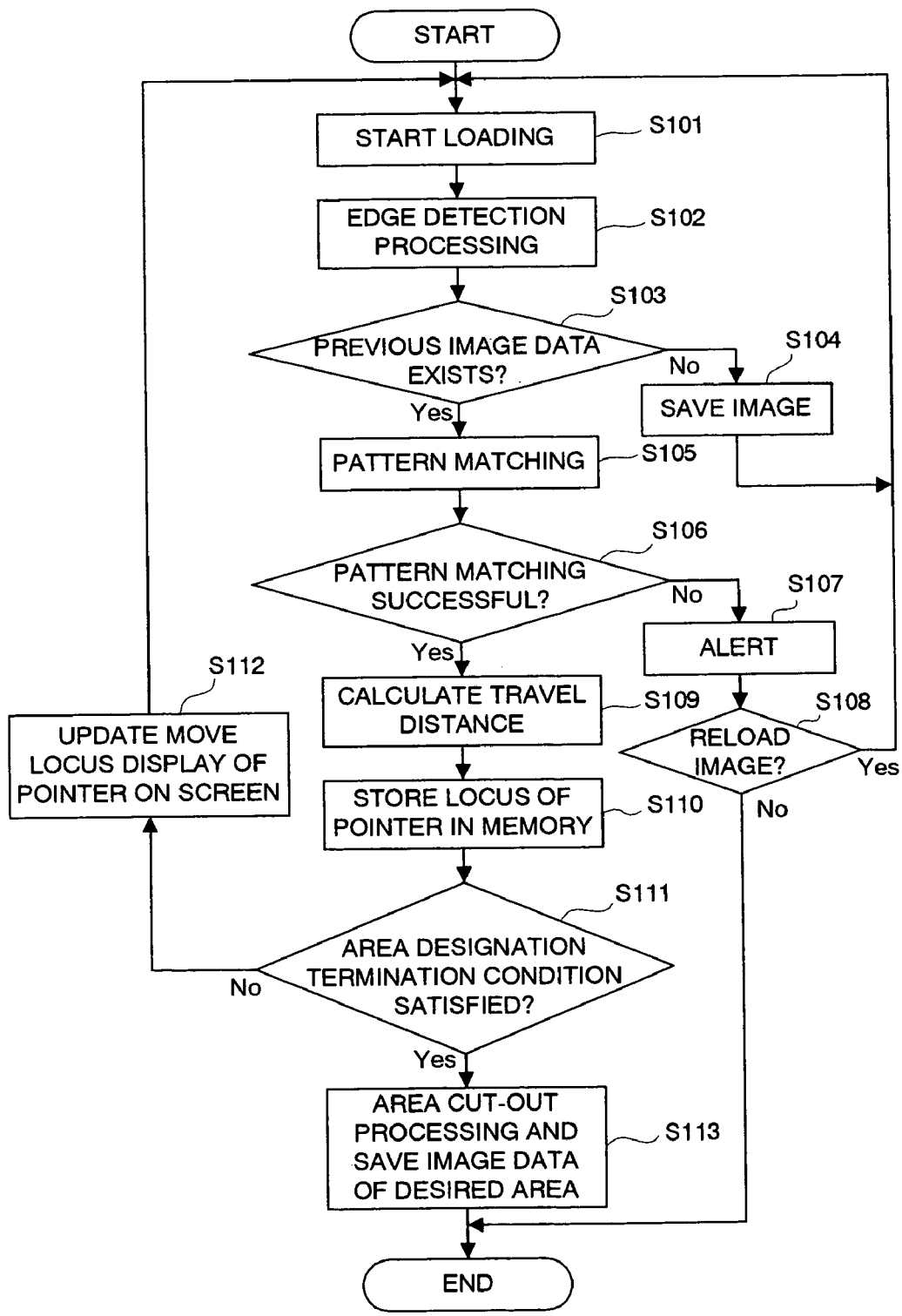
FIG. 4 is a flowchart showing an operation of the cellular phone.
Figure 8:
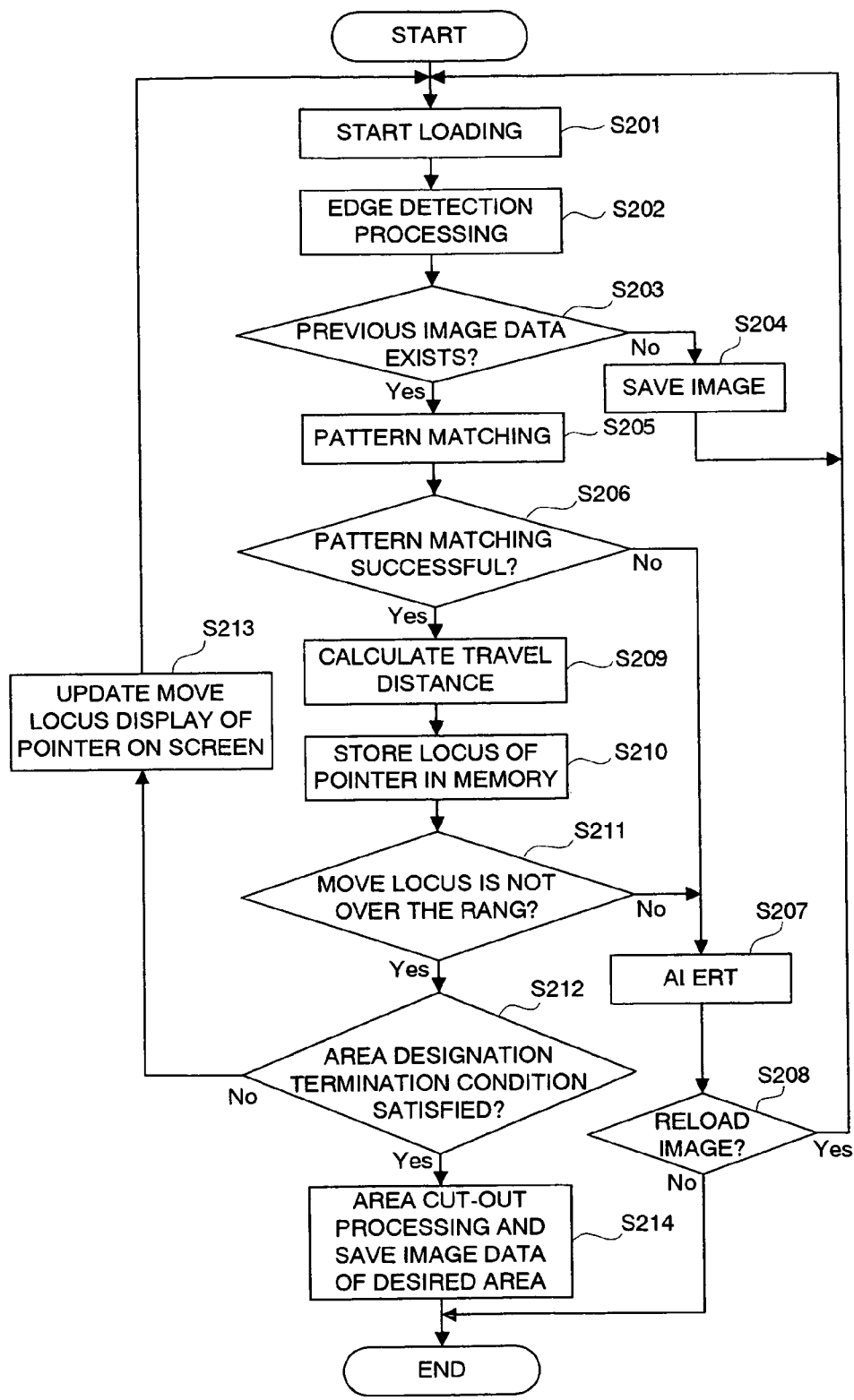
FIG. 8 is a flowchart showing an operation of the cellular phone.

In the flowchart of FIG. 8, since processings from a step S201 to a step S219 are the same as the processings in the flowchart of FIG. 4, description of those parts will be refrained from.

In a step S210, after the pointer move locus is stored in the move locus storing area 12f of the memory 12, the CPU 18 calculates respective total move locus in X direction and Y direction, and as a result of this calculation, judges whether or not the move locus exceeds a predetermined move limit range (step S211).

If the CPU 18 judges that the move locus exceeds the predetermined move limit range ("No", in the step S211), the CPU 18, after displaying an alert by a processing of a step S205 (step S207), displays a message on the screen 22 whether or not to reload the image, to prompt the user for an instruction operation (step S208).

Here, if it is instructed by the key operation part 11 that the reloading should carried out ("Yes" in a step S208), the CPU 18 returns to the step S201 and repeats the processings of the previous steps from S201 to S206.

If the CPU 18 judges that the move locus does not exceed the move limit range ("Yes" in a step S211), the CPU 18 proceeds to a judgment processing of whether or not the area designation termination condition (judgment condition) is satisfied (step S212).

As for after the step S212, here again, the same processings described in the flowchart of FIG. 4 are performed and description thereof will be refrained from.

As describe above, by a series of processings, response in the case that the range which can be designated is exceeded becomes possible.

Incidentally, in the judgment processing of S212, for the purpose of judging whether or not the move locus exceeds the move limit range, a value of the move limit range can be set slightly smaller than a value half of the screen so that the alert is displayed to the user just before the move locus runs off the screen, preventing the user from moving the cellular phone body 10 (camera 15) any more.

Next, another embodiment to describe an area will be described with reference to FIG. 9 to FIG. 13.

Figure 9:
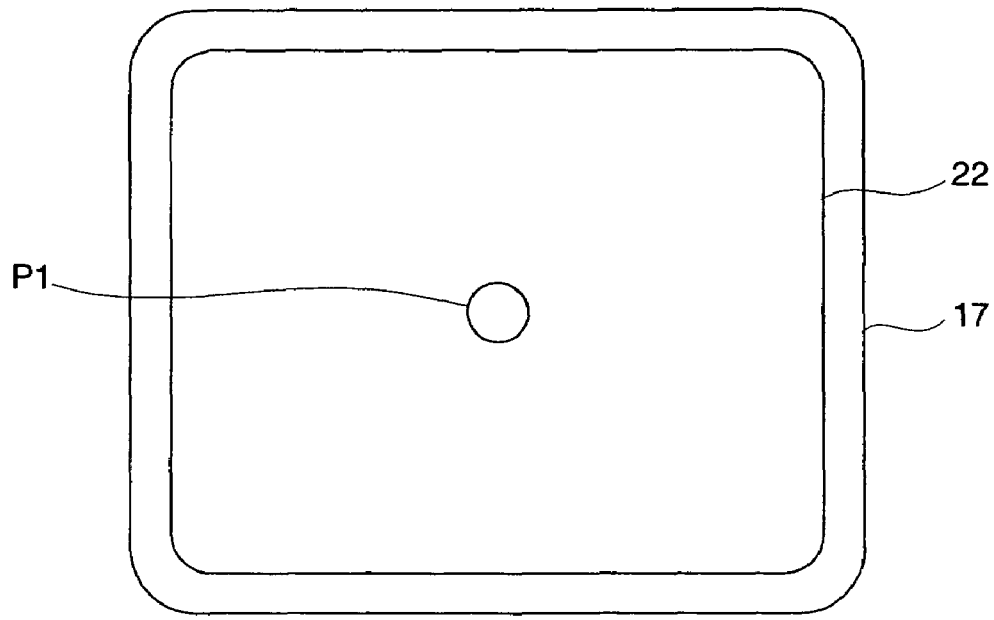
FIG. 9 is a view showing a display example of another pointer.

FIG. 9 is a view showing a screen on which a pointer P1 in a highlighter pen form is displayed.

It is assumed that, instead of the above-described cruciform pointer P, the pointer P1 in the highlighter pen form is displayed on a screen 22 as shown in FIG. 9, by a selection operation of a user. The pointer P1 is, for example, a figure such as • or ♦ which is translucent and colored inside, or an outlined closed figure with a given width (○ or □ form).

The pointer P1 designates an area using the width of the figure. In this example, description is carried out in an assumption that ○ form is set.

In this case, instead of displaying the move locus by the broken line and designating the desired area by closing the broken line (enclosing a periphery of a character) as in the case of the above-described pointer P, since the move locus of the pointer P1 is displayed lengthways in the given width by the desired area being traced with the pointer P1, the area included in this width is designated.

When a imaging operation of a business card 21 being a photographic subject R1 by a camera 15 is started by an operation of a function key or the like, an image 21a of the business card 21 inputted from the camera 15 is displayed on the screen 22.

Figure 10:
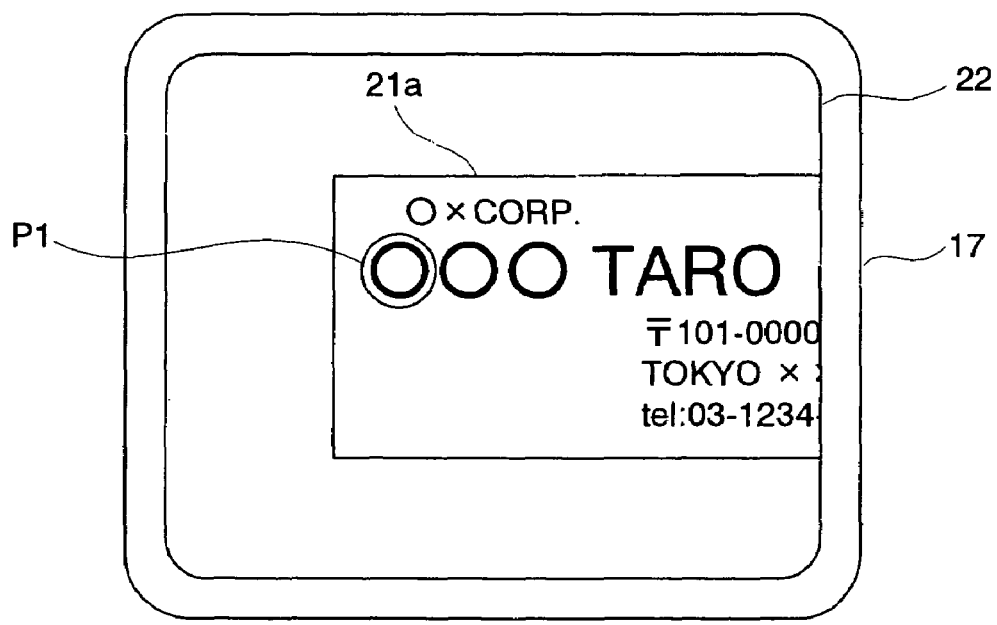
FIG. 10 is a view showing a state in which the pointer is set to a starting point.

Here, first, as shown in FIG. 10, the user moves a cellular phone body 10 to set the pointer P1 to a starting point of a desired area to be loaded in the image 21a of the screen 22, and while pressing a button indicating a start of area designation, for example, a function key, moves the cellular phone body 10 in a right direction to move the image on the screen 22.

Then, while the function key is ON, a CPU 18 stores a move locus of the pointer P1 in a unit of width in a move locus storing area 12f of a memory 12 and updates a displaying thereof.

Figure 11:
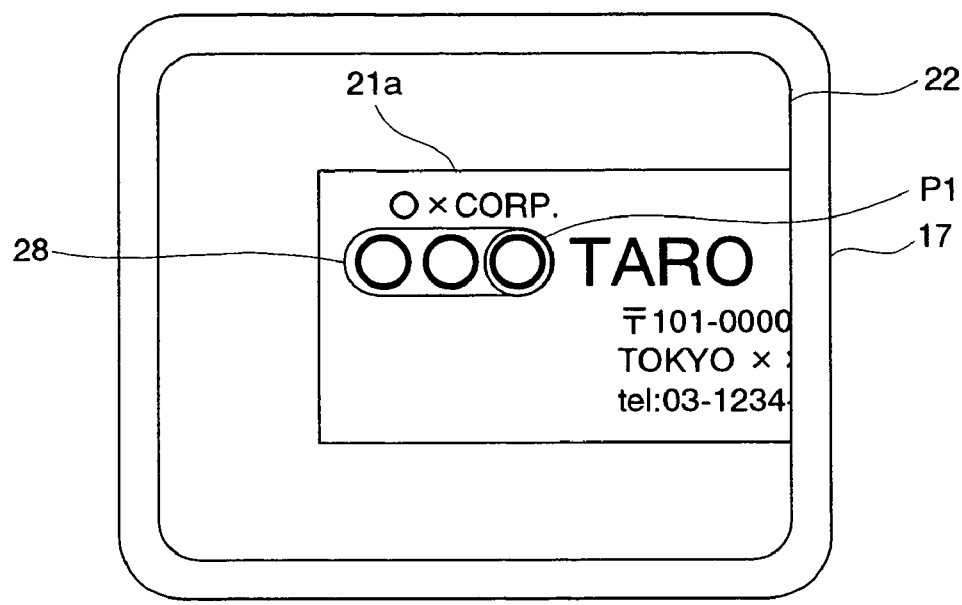
FIG. 11 is a view showing a state in which an area is traced and designated by the pointer.

As a result of this update, as shown in FIG. 11, an image 28 of the move locus is displayed in a manner to be expanded laterally.

That is, an area of the move locus of the pointer P1 moving is made by a movement in one direction.

An operation at this time is different from that of the cruciform pointer P.

Figure 12:
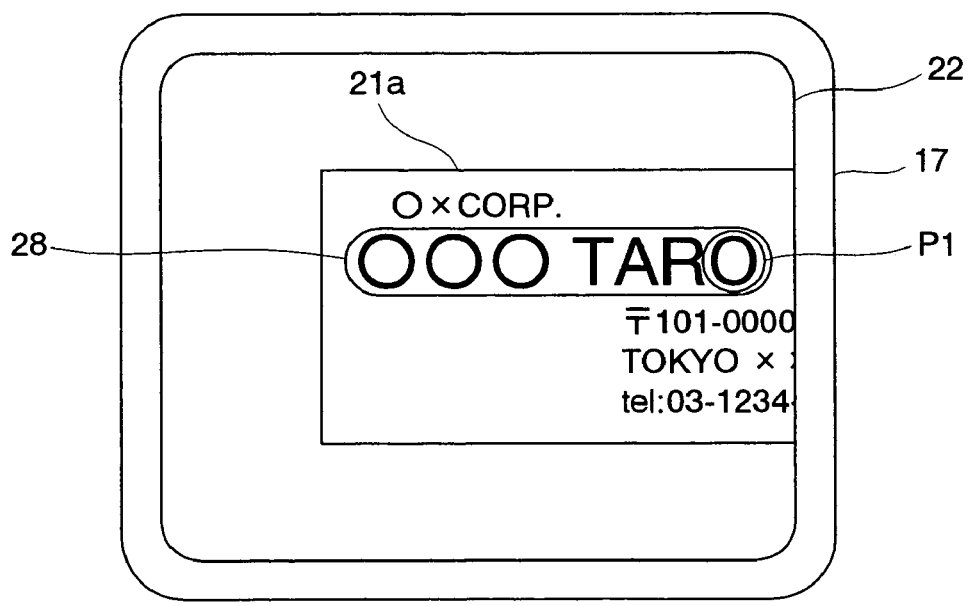
FIG. 12 is a view showing a state in which designation of the area by tracing by the pointer is terminated.

Subsequently, as shown in FIG. 12, when the user stops moving the cellular phone body 10 and stops pressing the function key at a point that the desired image area falls within the move locus of the pointer P1, the CPU 18 detects that the function key switches from an ON state to an OFF state, and with this timing being a trigger, the CPU 18 judges that an area designation termination condition is satisfied.

Incidentally, without the operation of the function key, the CPU 18 may judge that the designation termination condition is satisfied, for example, by detecting a state in which the pointer P1 halts for a given length of time.

Operations after the judgment that the area designation termination condition is satisfied (processings after a step S112 of FIG. 4) are the same as those of the cruciform pointer P described above.

Figure 13:
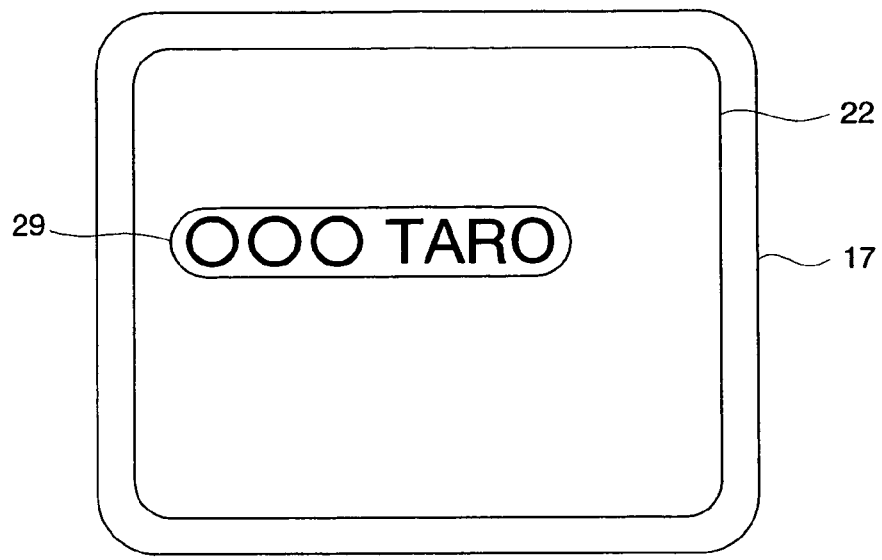
FIG. 13 is a view showing a state in which the designated area is displayed.

As a result of termination of an area cut-out processing and an image data saving processing (S113), as shown in FIG. 13, only an area 29 which is cut out is displayed on the screen 22.

As a result of the above processings, it becomes possible that the user easily designates the desired area to be loaded in images displayed on the screen and saves the desired area, without providing an interface device such as a touch panel to the cellular phone body 10.

In this first embodiment, there is described the case that the area of the desired image to be loaded is displayed in the screen all the time.

As described above, according to the cellular phone of the first embodiment, the user refers to the pointer displayed in a manner to overlap the desired image to be loaded which is displayed on the screen, and encloses the desired area to be loaded or traces the area with the pointer.

Hereby, designation of an area to be loaded becomes easier, and further, an image of a size which does not fall within the screen can be loaded by one operation.

Additionally, when moving images are loaded, by a plurality of images existing for the same area and by using those images, an image with higher precision than an image imaged ordinarily can be generated.

That is, in the cellular phone of the first embodiment, without using the interface such as a touch panel or a position designating device, it is possible to display the pointer to designate a loading position simultaneously with being displayed, detects and stores the movement of the pointer moving on the image imaged as the camera 15 moves, the area which the pointer finally indicates can be loaded as image data.

Second Embodiment

Figure 14:
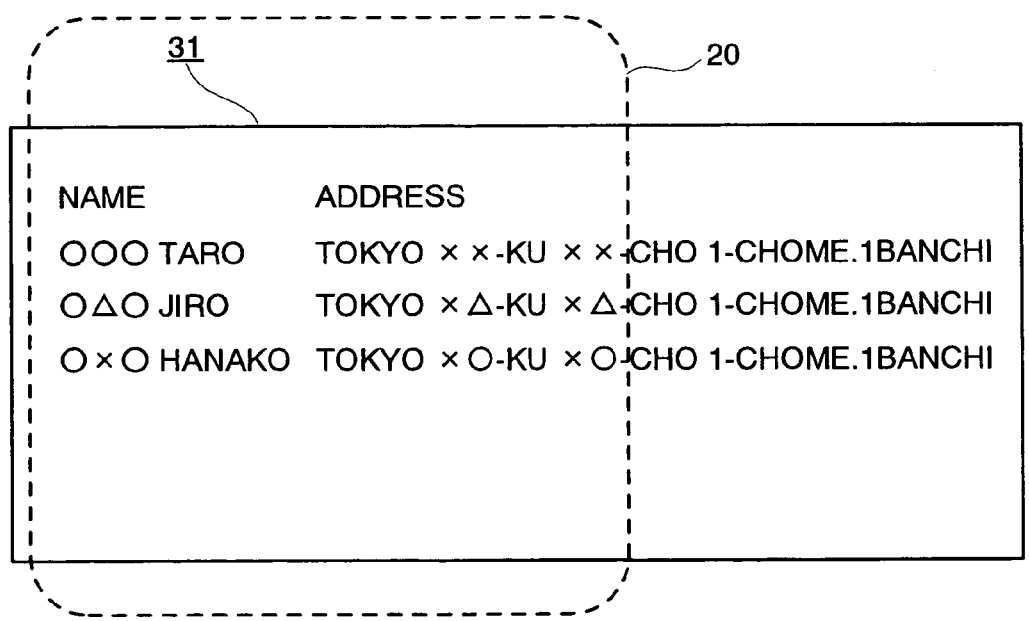
FIG. 14 is a view showing an image pick-up range and a size of a nominal list.

FIG. 14 is a view showing an example of a case that a photographic subject R1 to be loaded by a cellular phone of the present embodiment is a business form such as a nominal list 31, for example, whose desired object area to be loaded runs off a screen.

Incidentally, a hardware configuration is the same as that of the image processing device of the first embodiment of the present invention shown in FIG. 1, and description thereof will be refrained from.

If the photographic subject R1 to be loaded by the cellular phone is the business form such as the nominal list 31, for example, whose desired object area to be loaded runs off the screen of a display 17 as shown in FIG. 14, the area cannot be specified only by the saving of the previous image data in the first buffer 12c as in the above example.

Figure 15:
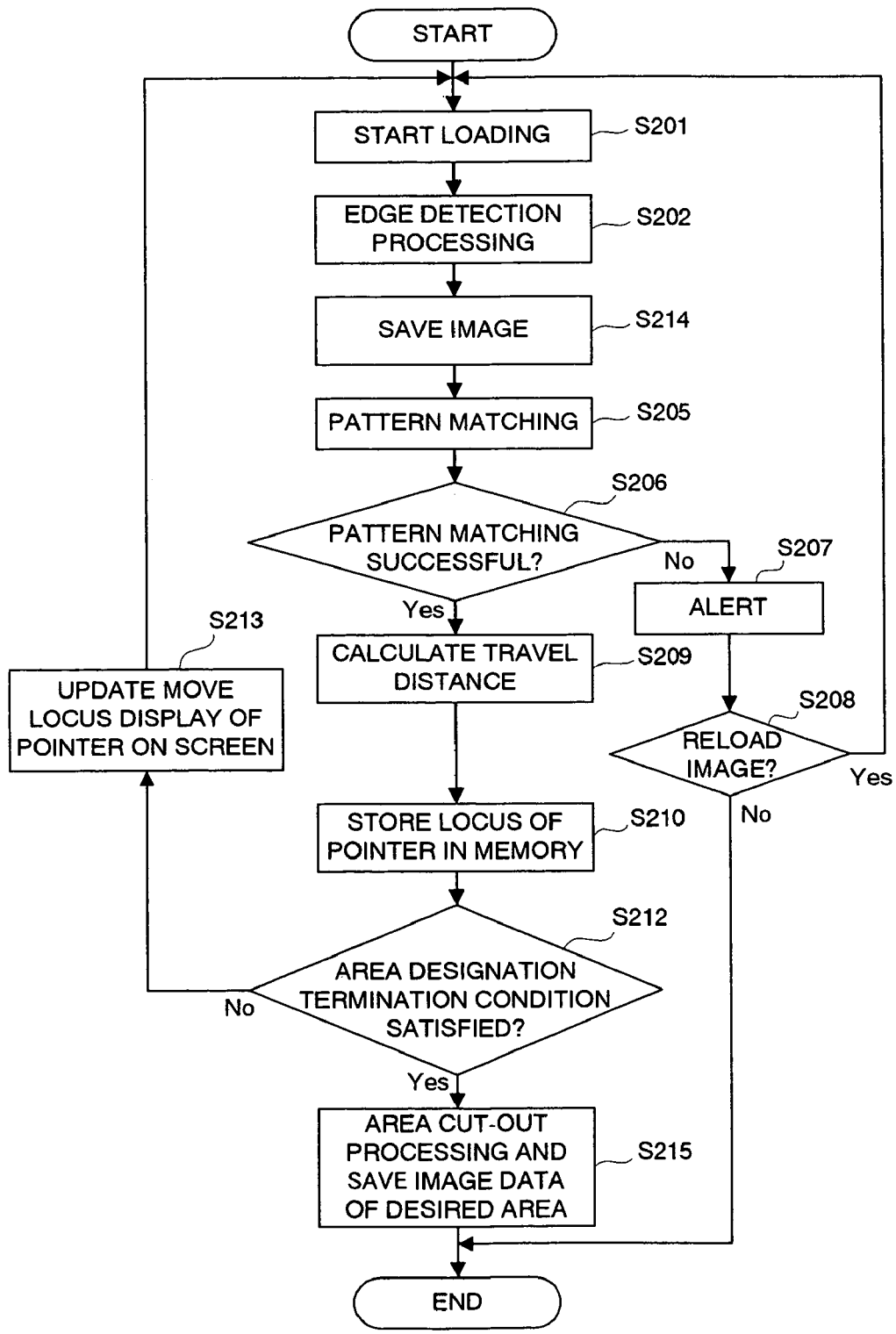
FIG. 15 is a flowchart showing an operation of a cellular phone.

Thus, in the case of this example, as shown in FIG. 15, a CPU 18 saves images inputted from a camera 15 in an image data saving area 12e sequentially at a predetermined time interval (S214).

Incidentally, the same numerals and symbols will be used to designate the steps in which the same operation is carried out as in the above-described first embodiment, and description thereof will be refrained from.

Subsequently, when an area designation termination condition is satisfied (S212) and the desired area designated by the user is decided, the CPU 18 connects a plurality of still images saved in the image data saving area 12e to generate one image.

The CPU 18 cuts out the designated area in question from the generated image, and saves the image as final image data in the image data saving area 12e (S215).

As for a method to achieve a connection processing of the image, by combining the edge detection processing and the pattern matching processing which are already described, for example, the connection processing is achieved.

Also, a high definition image by super resolution technology can be generated by utilizing the fact that regions with partial overlaps are imaged multiple times.

Here, displacement of the screen 22 will be described. If the photographic subject R1 is the nominal list 31 shown in FIG. 14, for example, there are a field for names, a field for addresses, and the like in the nominal list 31.

Among these, it is assumed that an area of an address of a certain person is selected and an image thereof is loaded. In this example, all the area of the address does not fall within the screen 22.

Figure 16:
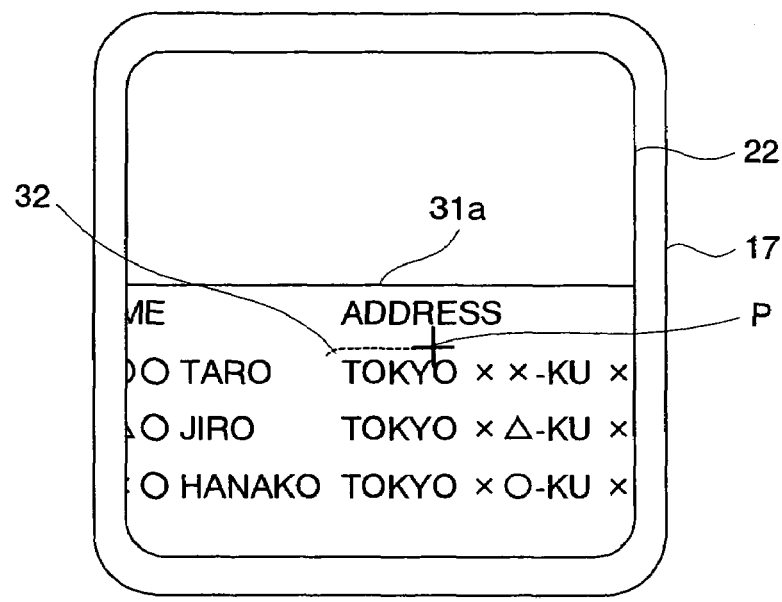
FIG. 16 is a view showing a state in which an area is designated on a screen of the cellular phone.

In this case, when the user sets a pointer P of the screen 22 to a designation starting point (left end of the address of ----- Taro, or the like) of a desired area in an image 31a of the nominal list 31 and moves a cellular phone body 10 while pressing a function key or the like of a key operation part 11, along with the movement a line 32 of a line for range designation is displayed in an extended manner on the screen 22, as shown in FIG. 16.

Figure 17:
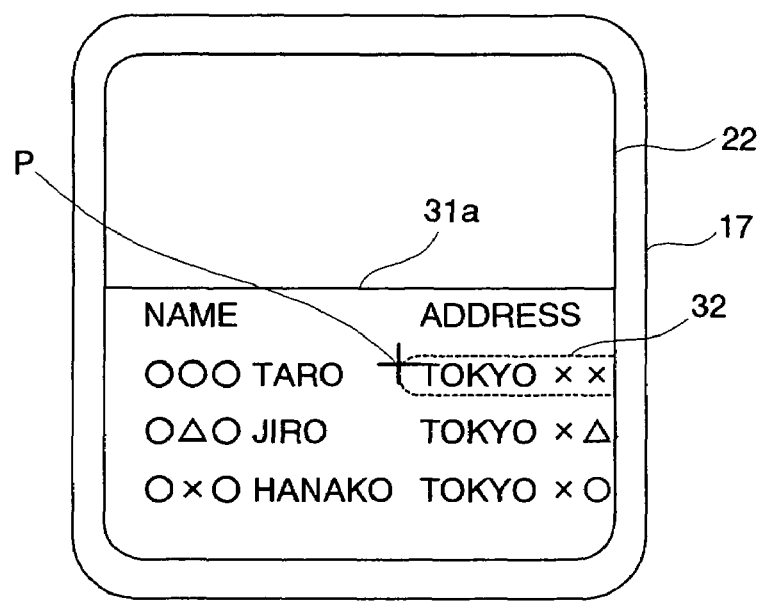
FIG. 17 is a view showing a state in which designation of the area is terminated.
Figure 18:
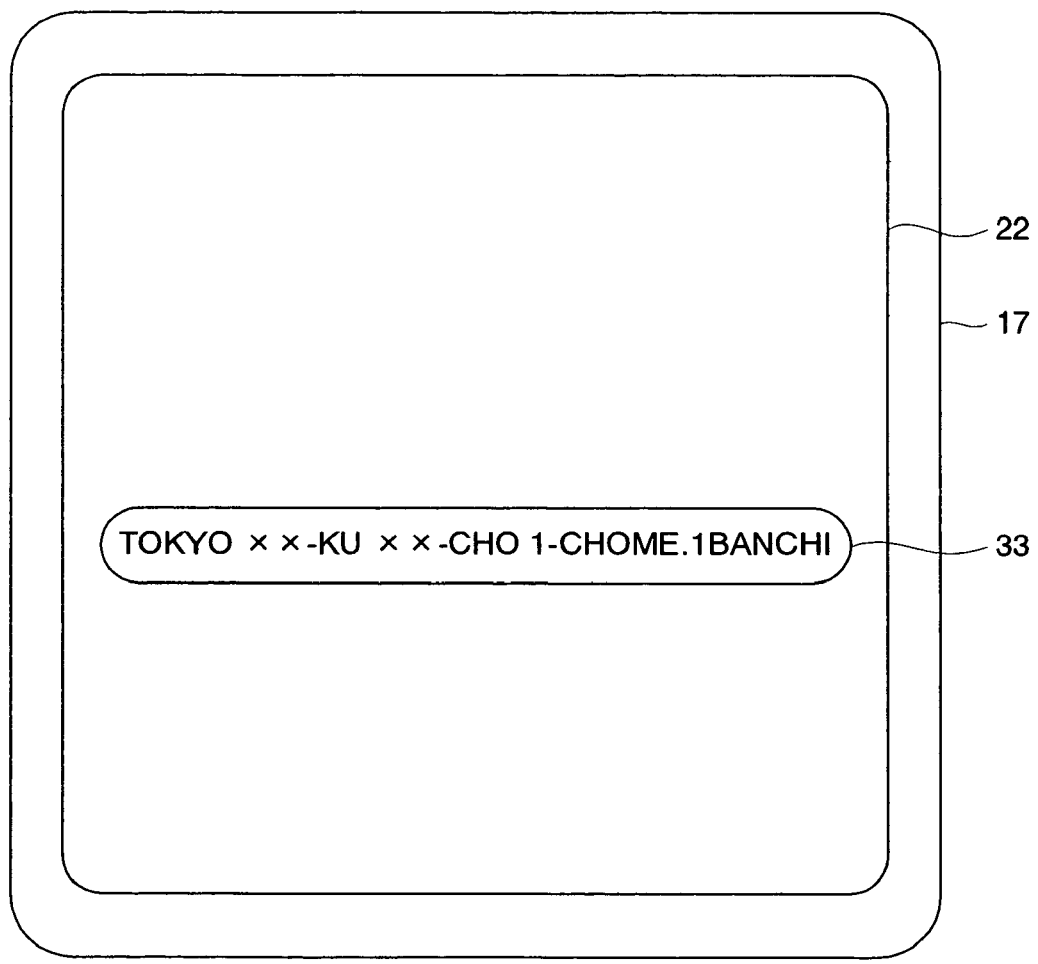
FIG. 18 is a view showing a state in which the designated area is displayed.

When the pointer P is continued to be moved so that the desired area of the address is enclosed by the line 32 of the move locus for range designation as shown in FIG. 17, the CPU 18 develops in a second buffer 12d the plurality of image data sequentially saved in the image data saving area 12e, detects an overlap of the images, perform connection processing on the plurality of images to generate one image data, and further, by deleting a part other than the area-designated area from the generated image, cuts out the designated area in question (leaving the designated area in question), and, as shown in FIG. 18, displays an image data 33 of that area part on the screen 22 as well as saves the data in the image data saving area 12e.

As for the timing of performing the connection processing on the plurality of images, in addition to the moment when the area is enclosed by the line 32 of the move locus to satisfy the area designation termination condition as described above, the connection processing can be preformed by the user pressing a predetermined button.

Additionally, at this occasion, the image may be highly defined by performing the super resolution processing as in the case described above.

As described above, according to the cellular phone of the second embodiment, even in the case that all the image is not displayed in the screen 22 such as the case of the nominal list 31, by sequentially saving the image data imaged by the camera 15 in the memory 12, one image is generated by connecting the plurality of image data based on an overlap state of the plurality of images, so that the image of the designated area can be cut out from the generated one image data.

Additionally, in the cellular phone body 10 of such a constitution, when an image of a larger area is to be loaded, a user can know at one view which area is not imaged, by detecting the area a imaging of which is completed and displaying on the screen 22 the area a loading of which is completed and an area which is not imaged in a distinguishable manner.

Third Embodiment

Figure 19:
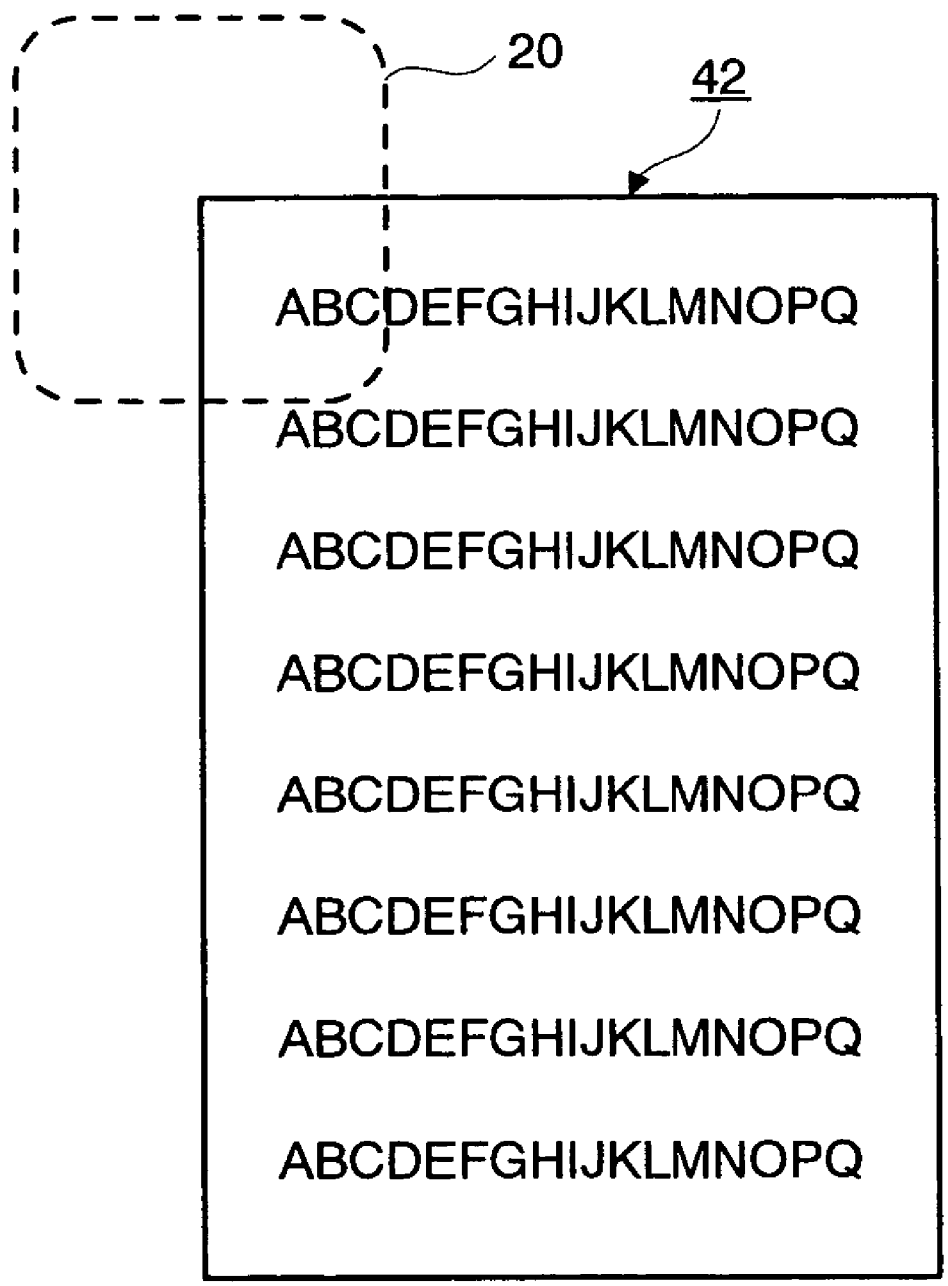
FIG. 19 is a view showing an image pick-up range and a size of writing paper.

This third embodiment is an example of a case that a photographic subject R1 is a business form of a large size such as writing paper 42 as shown in FIG. 19, for example, and an image pick-up range 20 of a camera 15 is only a part thereof, wherein an entire image of the writing paper 42 is loaded in a memory 12 of a cellular phone body 10.

In this example, a pointer is not displayed but a move locus is stored in an outer shape of an image pick-up range 20 itself.

Figure 21:
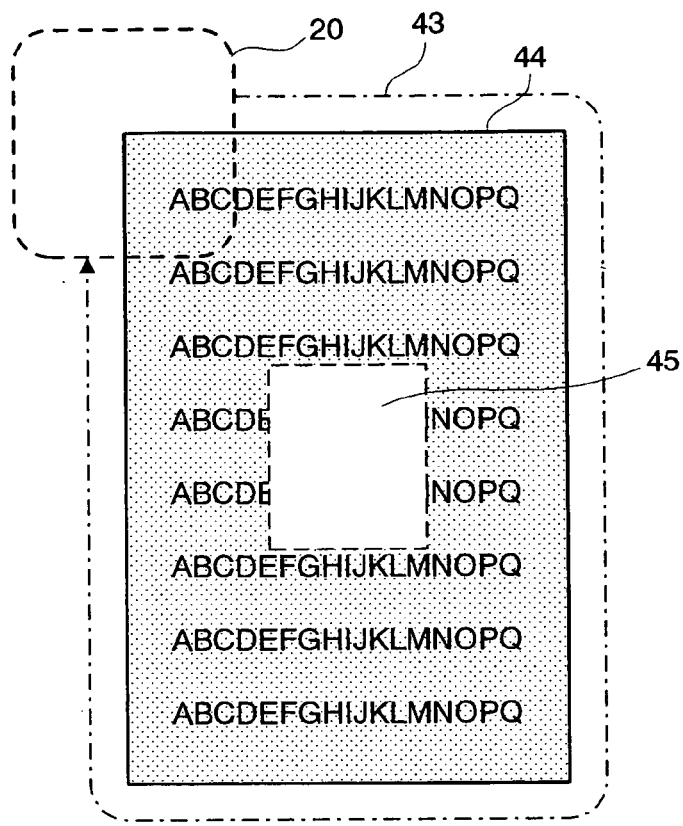
FIG. 21 is a view showing a state in which an area is designated by a unit of an image pick-up range.

In this case, a user aims the camera 15 in a direction of a surface of the writing paper 42, instructs a start of loading by operating a function key or the like of a key operation part 11, and as shown in FIG. 21, moves the cellular phone body 10 in a direction of an arrow 43 from a state in which the image pick-up range 20 is to be imaged.

Figure 20:
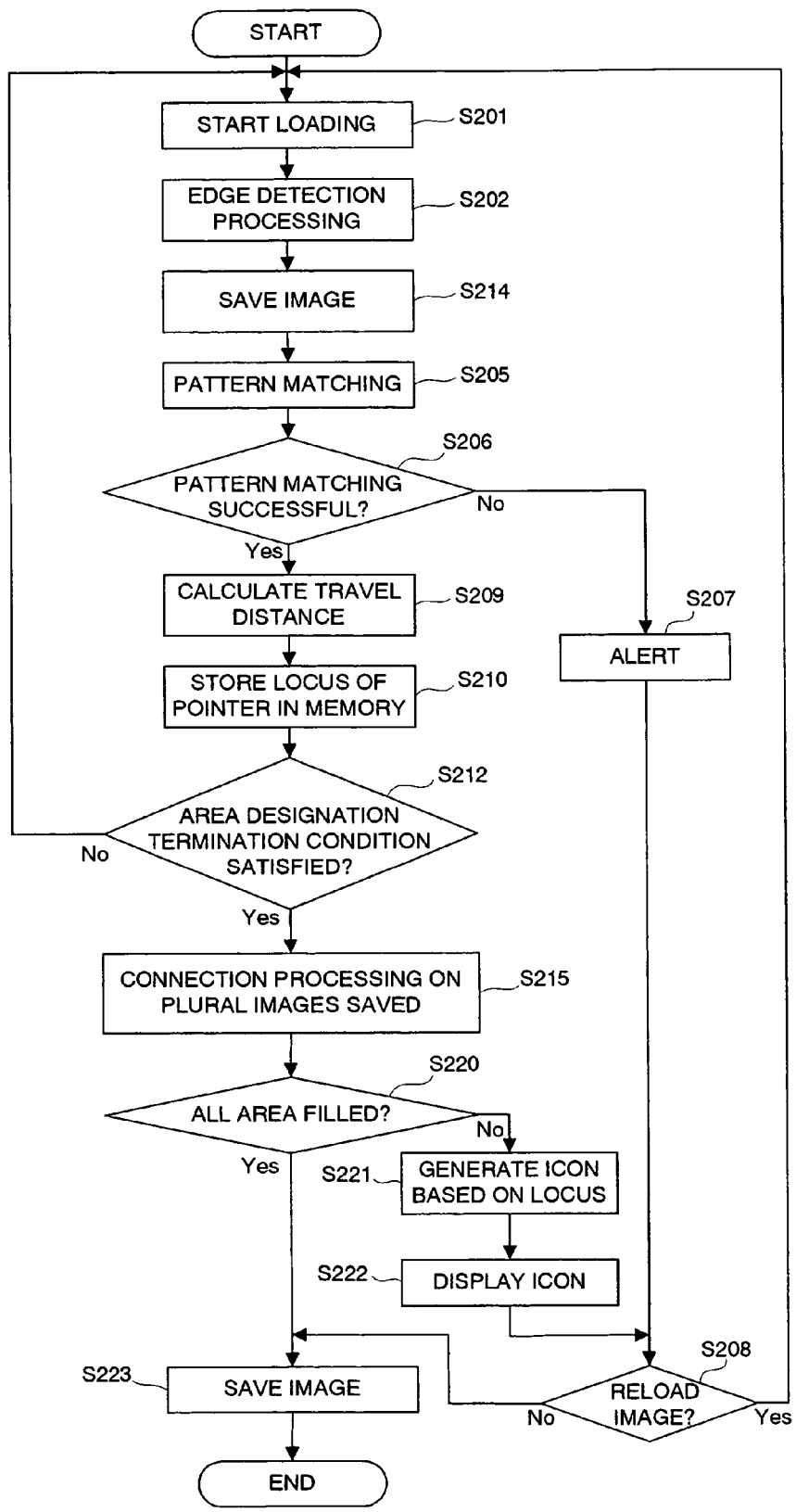
FIG. 20 is a flowchart showing an operation of a cellular phone.

Then, a CPU 18 starts loading an image data imaged by the camera 15 (step S201 of FIG. 20).

The CPU 18 performs an edge detection processing of the image data imaged by the camera 15 (step S202), and saves the image data in an image data saving area 12e (step S214).

Then, the CPU 18 compares image data saved in the image data saving area 12e and image data having been already saved in the image data saving area 12e (image data being a comparative base), that is, performs a pattern matching processing (step S205).

If the image data being the comparative base does not exist in the image data saving area 12e and the pattern matching processing is not successful, ("No" in a step S206), the CPU 18 displays an alert (mark such as "!") indicating failure of the pattern matching on the screen 22 in a blinking manner (step S207).

Subsequently, the CPU 18 displays a message on the screen 22 asking whether or not to reload the image, to prompt the user for an instruction operation (step S208).

Here, if it is instructed by the key operation part 11 that reloading should be carried out ("Yes" in a step S208), the process returns to the processing of the step S201 and the processings of previous steps S201 to S206 are repeated.

If the image data being the comparison base already exist in the imaged at a saving area 12e and the pattern matching is successful ("Yes" in the step S206), the CPU 18 calculates a travel distance from the image data being the comparison base (step S209).

The CPU 18 stores in the move locus storing area 12f of the memory 12 position information on the image which is indicated by the calculated travel distance, as the information of the move locus (step S210).

After the move locus is stored in the move locus storing area 12f, the CPU 18 judges whether or not the move locus exceeds a predetermined move limit range (step S211).

If the CPU 18 judges that the move locus is not over the range ("Yes" in a step S211), judges whether or not an area designation termination condition (judgment condition) is satisfied (step S212).

As an example of the area designation termination condition, a matching property of the image data saved in the memory 12 at a start of loading and the image data loaded most recently is checked, and if there are many overlaps, it is judged as a return to an original position, and the area designation termination condition is considered to be satisfied.

Here, if the CPU 18 judges that the area designation termination condition is not satisfied ("No" in a step S212), the process returns to the processing of the step S201, the CPU 18 continuing the image loading processing.

Meanwhile, if the CPU 18 judges that the area designation termination condition is satisfied ("Yes" in the step S212), by the plurality of image data saved in the image data saving area 12e being retrieved to a second buffer 12d for the connection processing, images which are connected (hereinafter referred to as a connected image) are generated (step S215).

In a case of this example, even if the area designation termination condition is satisfied, it does not necessarily mean that the image of the entire business form is acquired as the connected image.

Thus, the CPU 18 judges whether or not all the area of the connected image is filled with the acquired image data (step S220).

Here, judgment is made by whether or not an area of a predetermined breadth filled with white dots exists in the connected image, for example.

If the white dot area with the predetermined breadth exists, the CPU 18 judges that all the area is not filled ("No" in the step S220), and generates an icon indicating a present state of image loading based on information of the move locus of a move locus storing area 12f and the above-described connected image (step S221).

The CPU 18 displays the generated icon in an upper right corner or the like in the screen 22 (step S222).

At this point, in the second buffer 12d, as shown in FIG. 21, a loaded area 44 (imaged area) is obtained as the connected image, and an almost center part of the loaded area 44 is an unloaded area 45 (unimaged area).

Then, the CPU 18 displays a message on the screen 22 asking whether or not to reload the image to prompt the user for an instruction operation (step S208).

Here, if it is instructed by the key operation part 11 that the reloading should be carried out ("Yes" in the step S208), the CPU 18 returns to the processing of the step S201 to repeat the previous processings of the steps S201 to S220.

If the white dot area with the predetermined breadth does not exist, the CPU 18 judges that all the area is filled ("Yes" in the step S220), and saves the connected image data acquired by connection processing in the image data saving area 12e of the memory 12 (step S223).

As an example of generating the icon indicating the present state of image loading, the CPU 18 retrieves the move locus information (position data) stored in the move locus storing area 12f, makes the move locus information overlap the connected image, and generates the connected image which includes the line of the move locus.

Then, the CPU 18 performs a reduction processing on the connected image to iconify the connected image, and as shown in FIG. 22, displays an icon 46 in a predetermined position in the upper right of the screen 22.

When iconifying the connected image, the CPU 18 displays the loaded area 44 and the unloaded area 45 in a distinguishable manner.

As a result of the fact that reloading of the image is carried out after it is instructed by the key operation part 11 that the reloading should be carried out, the image of almost the center part of the connected image 44 is obtained in addition to the connected image 44 shown in FIG. 21, which is buffered in the second buffer 12d, and then the CPU 18 connects image data each other (the image of the loaded area 44 and a new image) to generate one still image.

At this time, if an area broader than the unloaded area 45 is obtained as a new image, the CPU 18 may carry out a super resolution processing, that is, high definition processing, on an area in which the image of the loaded area 44 and the new image overlap each other.

As a result of the reloading, if the loaded area 44 increases and the unloaded area 45 decreases, the CPU 18 regenerates the icon 46 corresponding thereto, and by decreasing the blank part of the icon 46, clearly specifies to the user which area is not loaded.

Meanwhile, as a result of the reloading, if all the area is filled, the CPU 18 notifies (informs) the user of completion of the loading by deleting the icon 46 which has been displayed.

As described above, according to the cellular phone of the third embodiment, when the image of the broader area in relation to the image pick-up range 20 is loaded, by saving the plurality of images obtained from the camera 15, generating the connected image in which the plurality of images are connected as the loaded area 44 when the area designation termination condition is satisfied, and carrying out the reduction processing thereon to display the corresponding icon 46 on the screen 22, the loaded area 44 and other area (unloaded area 45) can be displayed in the distinguishable manner, so that the user can know which area is not imaged in one view.

Additionally, by carrying out the loading of the image to the unloaded area 45 again and connecting the image with the connected image whose loading is already completed, the image data with a large size which does not fall within the screen 22 can be obtained.

It should be noted that the present invention is not limited to the above-described embodiments.

In the above-described embodiments, the examples of the cellular phone with cameras are described, but a PDA with a camera or a constitution in which a computer is connected with a network camera or a Web camera which is held by the user to be operated can be used.

In the above embodiments, a software which realized the function of the present invention is stored in the memory 12 in advance, but one downloaded from a predetermined Web site via a cellular phone network or one installed in the cellular phone body 10 via a storage medium such as a memory card can be used.

Other Embodiments

The present invention is not limited to several embodiments described by illustration, but enlargement or modification is possible, and any enlargement or modification which comes within the scope of the appended claims is included in the technical range of the present invention.

What is claimed is:

1. An image processing device displaying on a display an image obtained by imaging a photographic subject with a camera while moving an image processing device body to which the camera and the display are mounted, the image processing device comprising:

a memory having an area capable of storing the image of the photographic subject imaged by the camera;

a memory controller which stores in sequence the image of the photographic subject with the camera to the memory along a movement of the image processing device body;

a termination condition judging part which judges that an area designation termination condition is satisfied if the image at a start of load overlaps the image loaded most recently by checking a matching property of the image stored in the memory; and an image connection part performing a connection processing on a plurality of images buffered in the memory when it is judged by the termination condition judging part that the area designation termination condition is satisfied.

2. The image processing device as set forth in claim 1, further comprising:

a saving control part saving the images connected by said image connecting part in said memory.

3. The image processing device as set forth in claim 2, wherein said image connecting part comprises a super resolution part generating a high definition image from a plurality of images when the plurality of images exist for the same area.

4. An image processing device displaying on a display an image obtained by imaging a photographic subject with a camera while moving an image processing device body to which the camera and the display are mounted, the image processing device comprising:

a memory having an area capable of storm the image of the photographic subject imaged by the camera;

a memory controller which stores in sequence the image of the photographic subject with the camera to the memo along a movement of the image processing device body at a time of imaging the photographic subject with the camera;

a termination condition judging part which judges that an area designation termination condition is satisfied if the image at a start of loading overlaps the image loaded most recently by checking a matching property of the image stored in the memory;

an area judging part judging whether or not an unimaged area exists in the image of the photographic subject when it is judged by said termination condition judging part that the area designation termination condition is satisfied; and an image connecting part performing a connection processing on a plurality of images buffered in said memory based on judgment results of said termination condition judging part and said area judging part.

5. The image processing device as set forth in claim 4, further comprising:

an unimaged area existence judging part judging whether or not an unimaged area exists in the images connected by said image connecting part; and a notifying part prompting whether or not to image an image again when it is judged by said unimaged area existence judging part that the unimaged area exists, and at a point that it is judged by said unimaged area existence judging part that the unimaged area is not left, notifying to that effect.

6. The image processing device as set forth in claim 5, further comprising an area displaying part displaying the unimaged area and an imaged area on the display in a distinguishable manner at the time of judging that the unimaged area exists as a result of a judgment by said unimaged area existence judging part.

7. The image processing device as set forth in claim 6, further comprising an updating part updating a displaying of each area of the display when the unimaged area and the imaged area vary by a new image being connected by said image connecting part.

8. The image processing device as set forth in claim 4, further comprising a notifying part carrying out a notification at a point that the unimaged area is not left by a new image being connected by said image connecting part.

9. An image processing device displaying on a display an image obtained by imaging a photographic subject with a camera while moving an image processing device body to which the camera and the display are mounted, the image processing device comprising:

a memory having an area capable of storing the image of the photographic subject imaged by the camera, and information of a move locus of the image displayed on the display;

a pointer displaying part displaying on the display a pointer to designate an area or a position of the image at a predetermined position of the display;

a memory controller storing, in the memory, the information of the move locus between the image of the photographic subject and the position of the pointer caused by a movement of the image processing device body at a time of imaging the photographic subject with the camera;

a termination condition judging part judging that an area designation termination condition is satisfied if an arbitrary area is enclosed by the locus when the image processing device reads the information of the move locus from the memory and makes the move locus overlaps the image; and an image processing part which captures the arbitrary area and saves the arbitrary area in the memory when it is judged by the termination condition judging part that the area designation termination condition is satisfied.

10. The image processing device as set forth in claim 9, further comprising at least a cruciform pointer to designate a point and a pointer in a highlighter pen form with a given width to trace an object part of the image as the pointers which said pointer displaying part displays on the display, and further comprising a user interface to select either one as usage.

11. The image processing device as set forth in claim 9, wherein the memory controller stores, in the memory, a plurality of pointers having different forms and further stores, in the memory, the information of the move locus in a format determined by the form of the pointer; and wherein the termination condition judging part judges that a termination condition is satisfied, based on different criteria for different forms of the pointers.

12. The image processing device as set forth in claim 9, wherein the termination condition judging part comprises a notifying part which, when the move locus of the pointer exceeds a predetermined range, notifies to that effect.

13. The image processing device as set forth in claim 9, further comprising:

an image connecting part performing a connection processing on a plurality of images buffered in the memory when it is judged by the termination condition judging part that the area designation termination condition is satisfied; and a saving control part saving the images connected by the image connecting part in the memory.

14. The image processing device as set forth in claim 13, wherein the image connecting part comprises a super resolution part generating a high definition image from a plurality of images when the plurality of images exist for the same area.

15. The image processing device as set forth in claim 9, further comprising:
- an area judging part judging whether or not an unloaded area exists in the images of the photographic subject when it is judged by the termination condition judging part that the area designation termination condition is satisfied; and
- an image connecting part performing a connection processing on the plurality of images buffered in said memory based on judgment results of said termination condition judging part and said area judging part.

16. The image processing device as set forth in claim 15, further comprising:
- an unimaged area existence judging part judging whether or not an unimaged area exists in the images connected by the image connecting part; and
- a notifying part prompting whether or not to image an image data again when it is judged by the unimaged area existence judging part that the unimaged area exists, and at a point that it is judged by the unimaged area existence judging part that the unimaged area is not left, notifying to that effect.

17. The image processing device as set forth in claim 16, further comprising an area displaying part displaying the unimaged area and an imaged area on the display in a distinguishable manner when it is judged that the unimaged area exists as a result of a judgment by said unimaged area existence judging part.

18. The image processing device as set forth in claim 17, further comprising an updating part updating a displaying of each area of the display when the unimaged area and the imaged area vary by a new image being connected by the image connecting part.

19. The image processing device as set forth in claim 15, further comprising a notifying part carrying out a notification at a point that the unimaged area is not left by a new image being connected by the image connecting part.

20. The image processing device as set forth in claim 9, wherein the image processing part captures an enclosed area of the image of the photographic subject.

\* \* \* \* \*

UNITED STATES PATENT AND TRADEMARK OFFICE
CERTIFICATE OF CORRECTION

PATENT NO.       : 7,570,878 B2                                             Page 1 of 1
APPLICATION NO.  : 11/389341
DATED            : August 4, 2009
INVENTOR(S)      : Kodaira et al.

It is certified that error appears in the above-identified patent and that said Letters Patent is hereby corrected as shown below:

Claim 1, column 17, line 6, change "load" to --loading--.

Claim 4, column 17, line 27, change "storm" to --storing--.

Claim 4, column 17, line 30, change "memo" to --memory--.

Claim 9, column 18, line 14, change "camera, and" to --camera and--.

Claim 9, column 18, line 30, change "overlaps" to --overlap--.

Claim 10, column 18, line 37, change "9,further" to --9, further--.

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,570,878 B2 Page 1 of 1
APPLICATION NO. : 11/389341
DATED : August 4, 2009
INVENTOR(S) : Kodaira et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Seventh Day of September, 2010

David J. Kappos
*Director of the United States Patent and Trademark Office*